US007136841B2

(12) United States Patent
Cook

(10) Patent No.: US 7,136,841 B2
(45) Date of Patent: *Nov. 14, 2006

(54) CENTRALIZED AUTHORIZATION AND FRAUD-PREVENTION SYSTEM FOR NETWORK-BASED TRANSACTIONS

(75) Inventor: David Cook, Dallas, TX (US)

(73) Assignee: Zix Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/994,973

(22) Filed: Nov. 23, 2004

(65) Prior Publication Data

US 2005/0131826 A1 Jun. 16, 2005

Related U.S. Application Data

(63) Continuation of application No. 09/427,968, filed on Oct. 27, 1999, now Pat. No. 6,853,987.

(51) Int. Cl.
*G06Q 99/00* (2006.01)

(52) U.S. Cl. ............................ 705/75; 705/64; 705/73; 705/74; 705/76; 705/77; 705/78; 705/79; 713/182; 713/183; 713/184; 713/185

(58) Field of Classification Search ............ 705/64–79, 705/35, 39–44; 713/182–186, 200–202
See application file for complete search history.

(56) References Cited

U.S. PATENT DOCUMENTS

| 4,801,787 | A | 1/1989 | Suzuki |
| 5,530,438 | A | 6/1996 | Bickham et al. |
| 5,832,063 | A | 11/1998 | Vysotsky et al. |
| 5,903,878 | A | 5/1999 | Talati et al. |
| 5,909,492 | A | 6/1999 | Payne et al. |
| 6,014,650 | A | 1/2000 | Zampese |
| 6,029,141 | A | 2/2000 | Bezos et al. |
| 6,047,270 | A | 4/2000 | Joao et al. |
| 6,205,435 | B1 | 3/2001 | Biffar |
| RE37,122 | E | 4/2001 | Levine et al. |
| 6,233,565 | B1 | 5/2001 | Lewis et al. |
| 6,327,578 | B1 | 12/2001 | Linehan |
| 2001/0042051 | A1* | 11/2001 | Barrett et al. .................. 705/65 |

FOREIGN PATENT DOCUMENTS

| EP | 385400 A2 | 9/1990 |
| JP | 10-326310 | * 8/1998 |

OTHER PUBLICATIONS

Garfinkel, Simson, O'Reilly & Associates, Inc. 1995/PGP: Pretty Good Privacy/pp. 218-219.
www.cybercash.com/Microsoft CPC Wallet/pp. 1-2.
www.Microsoft.com/Microsoft Passport Offers Streamlined Purchasing Across Leading Web Sites/pp. 1-5.
Dialog Fil 621, Accession No. 01129296, "Broadway & Seymour, Inc. Announces Transaction Authorization and Network Control Software", Dec. 5, 1989.

* cited by examiner

*Primary Examiner*—Jalatee Worjloh
(74) *Attorney, Agent, or Firm*—Fish & Richardson P.C.

(57) ABSTRACT

A system and method for authorizing certain aspects of network based transactions between a customer and a merchant is disclosed. At a credit card authorization system, merchant information, transaction information, and a credit card number of a customer is received from an e-commerce merchant. An authorization form at the credit card authorization system that contains the transaction information is created. An internet browser associated with the customer is caused to display the authorization form. A signature phrase is received from the customer via the authorization form. The received signature phrase is verified that it corresponds to a signature phrase stored in a credit card account associated with the credit card number. The internet browser associated with the customer is caused to be transferred to a web site associated with the e-commerce merchant.

28 Claims, 5 Drawing Sheets

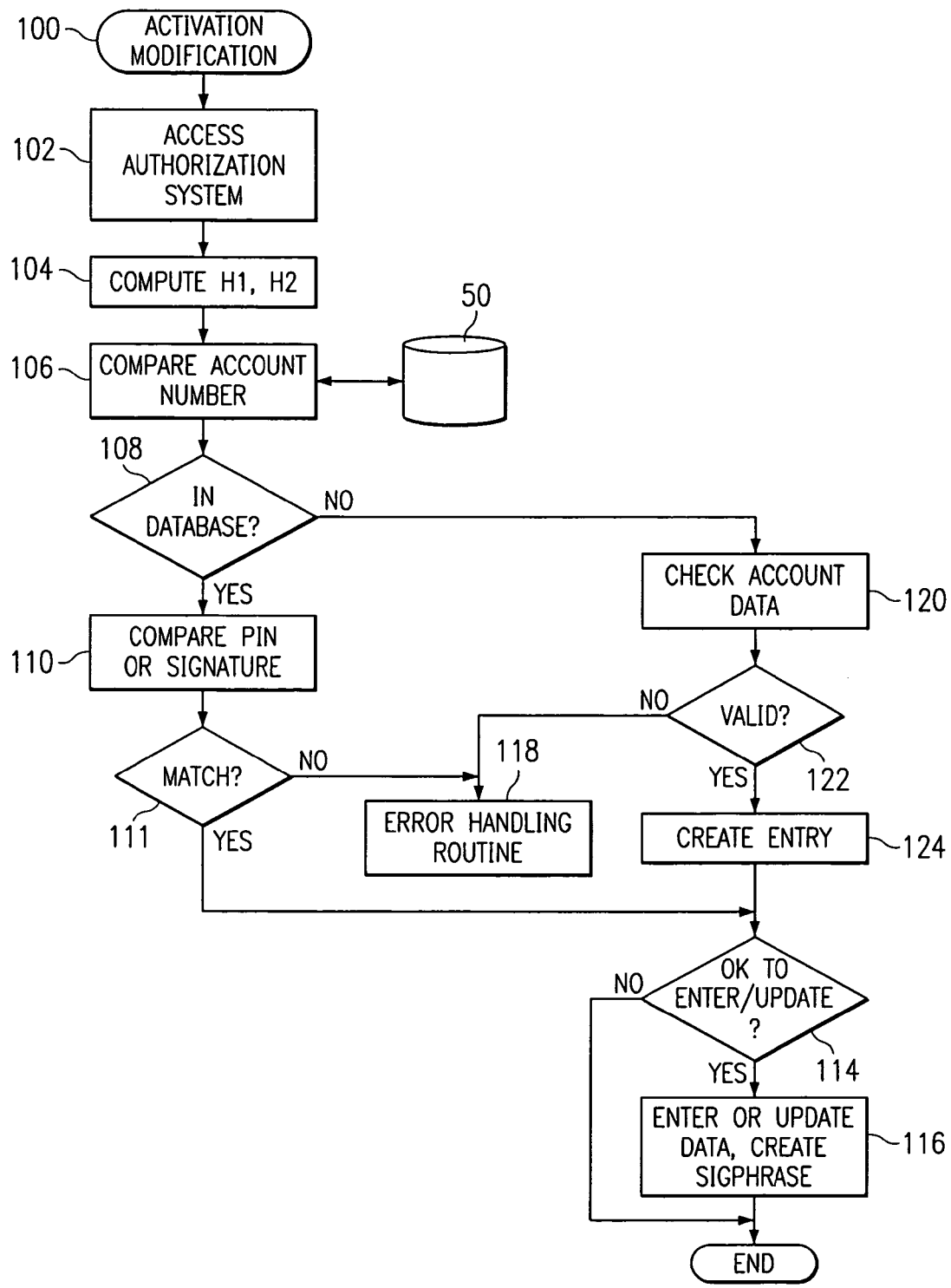

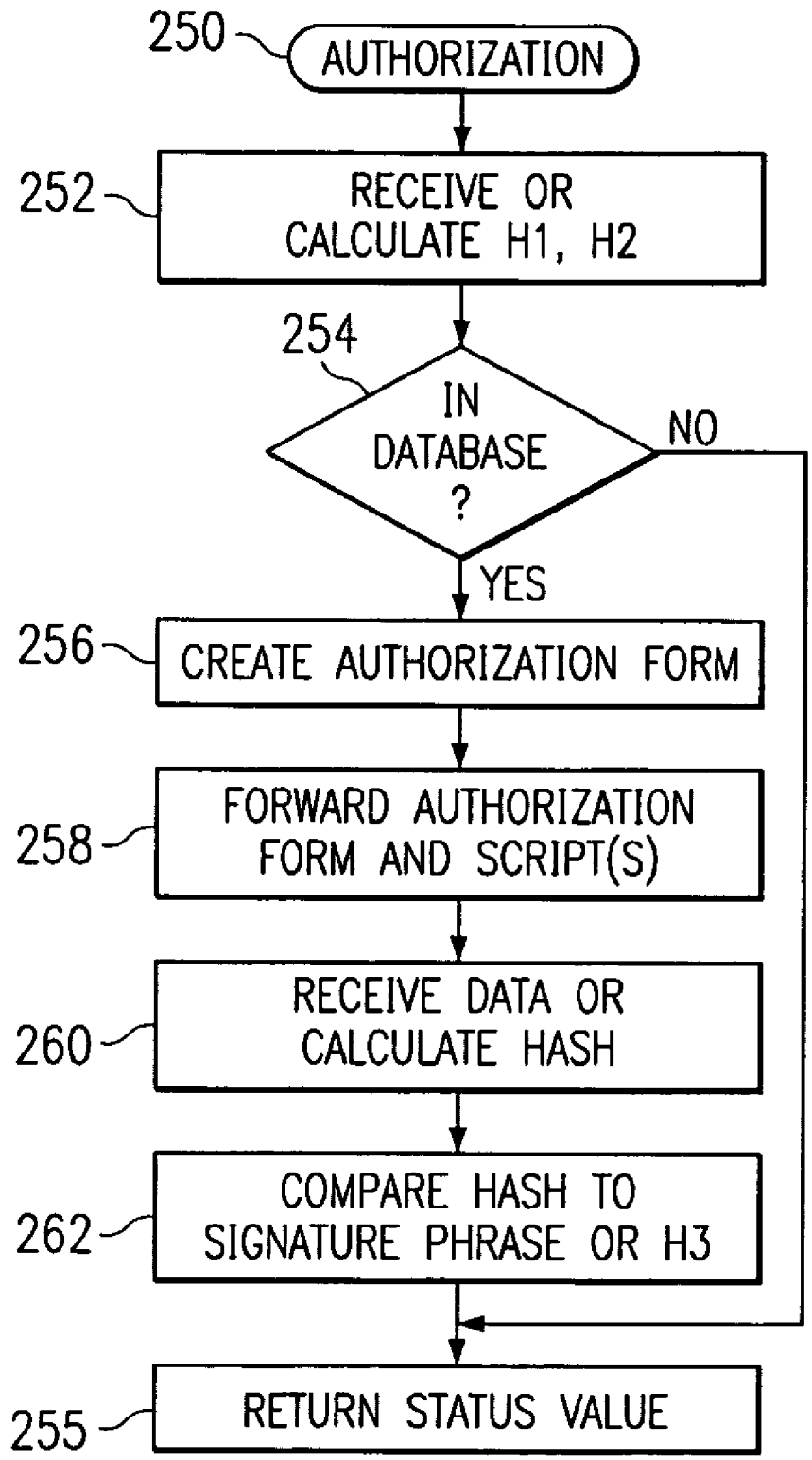

CENTRALIZED AUTHORIZATION AND FRAUD-PREVENTION SYSTEM FOR NETWORK-BASED TRANSACTIONS

RELATED APPLICATION

The present application is a continuation of, and claims priority to, U.S. patent application Ser. No. 09/427,968, entitled Centralized Authorization and Fraud-Prevention System for Network-Based Transactions, filed Oct. 27, 1999, now U.S. Pat. No. 6,853,987, the entire disclosure of which is incorporated herein.

TECHNICAL FIELD

This invention relates generally to electronic commerce and, more particularly, to a system and method for authorizing certain aspects of network based transactions.

BACKGROUND

There are many emerging trends in the communications world, including the increase in network technology and the proliferation of data networks. These trends have advanced the proliferation of e-commerce, i.e., commerce that occurs over an electronic network such as the Internet. E-commerce enables certain customers to purchase goods and services using an account number by contacting a merchant directly over the network. Common e-commerce scenarios include a person at home using a credit card to purchase a product from an on-line store over the Internet, and an employee of a corporation acting as a buyer/authorizer for acquiring resources using a company issued account number.

SUMMARY

A centralized authorization and fraud-prevention system for network-based transactions is disclosed. In one embodiment a method for authorizing transactions comprises receiving, at a credit card authorization system, merchant information, transaction information, and a credit card number of a customer from an e-commerce merchant. An authorization form is created at the credit card authorization system that contains the transaction information and an internet browser associated with the customer is caused to display the authorization form. A signature phrase is received from the customer via the authorization form, the received signature phrase is verified that it corresponds to a signature phrase stored in a credit card account associated with the credit card number. The internet browser associated with the customer is transferred to a web site associated with the e-commerce merchant.

In another embodiment, a method for authorizing transactions over a network comprises receiving, at an authorization system, account information and user node information after a user has initiated a transaction from a merchant using a network interface on a node associated with the user in communication with a node associated with the merchant, determining whether the account information corresponds to an account entry in an authorization database, creating an authorization form at the authorization system, sending the authorization form from the authorization system to the network interface on the node associated with the user as indicated by the user node information, receiving an authentication phrase from the user via the authorization form, verifying that the received authentication phrase corresponds to an authentication phrase in the account entry, and transferring the network interface of the user from the authorization system to the node associated with the merchant.

In a further embodiment, a method for authorizing e-commerce transactions, comprises receiving at a central authorization facility, a first merchant information and a first user information from a first merchant for a first transaction and verifying from at least one of the first merchant information and the first user information whether signature authorization is to occur. If signature authorization is to occur, an authorization form is prepared at the central authorization facility. This embodiment also provides the authorization form to a node indicated by the first user information, receives signature authorization from the node through the authorization form, authorizes the first merchant to obtain credit authorization for the first transaction if the signature authorization corresponds to the first user information, indicates the authorization to the first merchant, and transfers an internet browser associated with the first user to a node indicated by the first merchant information.

In yet another embodiment, a method for verifying the identity of a customer over a network comprises receiving, at a verification system, merchant information and customer account information after a customer has initiated a transaction from a merchant using a network interface, determining whether the customer account information corresponds to an account entry in a verification database, creating an authentication form at the verification system, causing a network interface of the user to display the authentication form, receiving an authentication phrase from the user via the authentication form as displayed to the user, verifying that the received authentication phrase corresponds to a stored authentication phrase in the account entry; and transferring the network interface of the user to a node associated with the merchant.

In an additional embodiment, a method for authorizing transactions between a customer and an e-commerce merchant comprises receiving, at a credit card authorization system, e-commerce merchant information and a credit card number of a customer for a first transaction, determining whether the credit card number corresponds to a credit card account in a credit card database, creating an authorization form at the credit card authorization system for the first transaction, displaying the authorization form to the customer via an internet browser, receiving a first signature phrase from the customer indicating authorization for the first transaction, verifying that the received signature phrase corresponds to a stored signature phrase in the credit card account, and transferring the internet browser of the user to a URL associated with the e-commerce merchant.

BRIEF DESCRIPTION OF THE DRAWINGS

FIG. 4 is a flowchart of an account activation/modification process.

FIG. 7 is a flow chart of an authorization process.

DETAILED DESCRIPTION

The present invention provides a unique system and method for authorizing certain aspects of network based transactions. It is understood that the following disclosure provides many different embodiments, or examples, for implementing different features. Techniques and requirements that are only specific to certain embodiments should not be imported into other embodiments. Also, specific examples of networks, components, and formats are described below to simplify the present disclosure. These are, of course, merely examples and are not intended to limit the invention from that described in the claims.

A number of items are used herein to describe certain account information.

"Account number" refers to a number that identifies a specific account from an account issuer. One example-of an account number is a credit card number issued from a bank or other financial entity. Another example is a corporate charge account number provided by a corporation. Additional examples of account numbers include debit card numbers, organizational card numbers, membership identification numbers, social security numbers, e-mail addresses, and the like.

"Account code" refers to a unique number or phrase that is assigned to a specific account by the account issuer and indicates certain rights, such as ownership, to the account. Often, the account code is used to verify that the user of a specific account number is legitimate. Common examples of account codes include PINs, employee codes, and passphrases.

"Signature Phrase" is a term used in the following disclosure to indicate a new and unique phrase associated with a particular account and that is created either by the user/owner of the account or by the account issuer. The Signature Phrase is not associated with the account, except as provided in the present disclosure. There may be multiple Signature Phrases for a specific account.

"Activation code" is a term used in the following disclosure to designate numbers or phrases that are used to access, activate, or modify a database entry of the present invention that relates to a specific account. An activation code may be an account code or a Signature Phrase.

Exemplary Network

Figure 1:
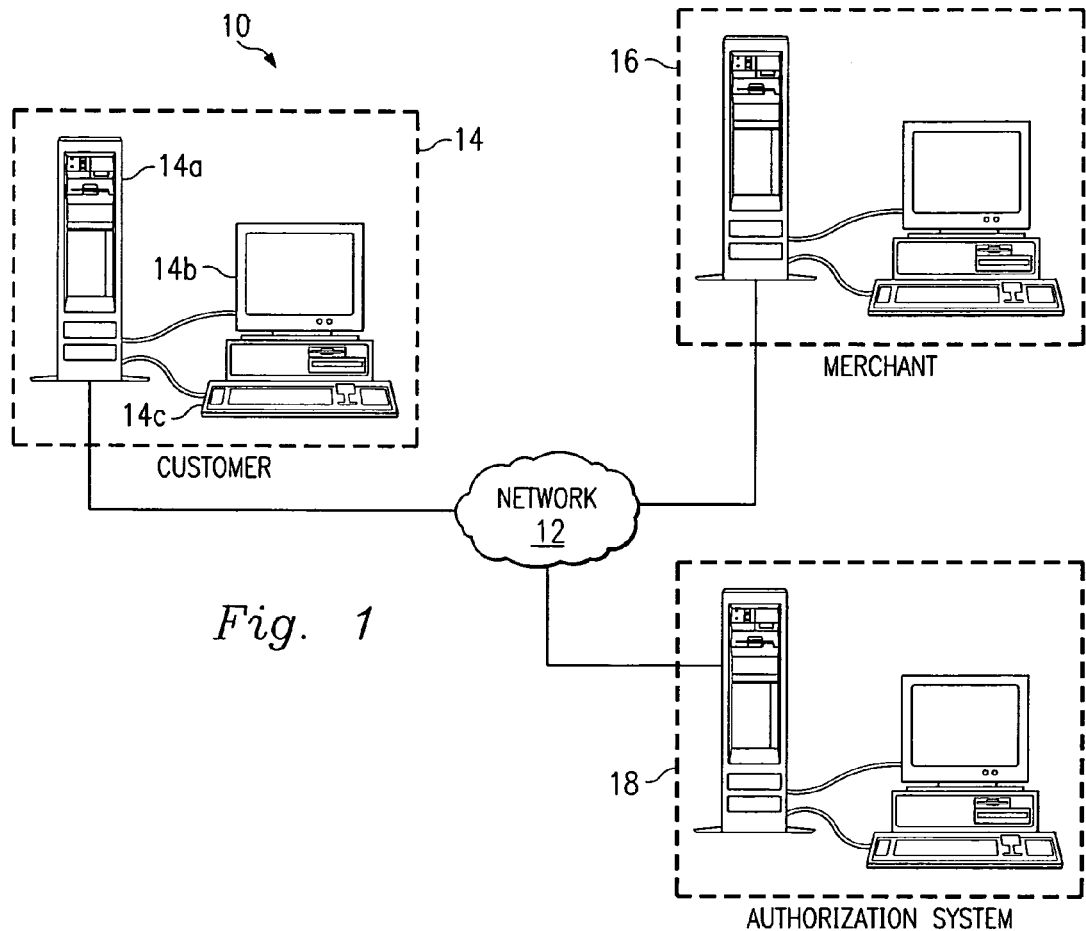
FIG. 1 is a diagram of a network and several nodes for implementing one embodiment of the present invention. The nodes represent a customer, a merchant, and an authorization system.

Referring now to FIG. 1 of the drawings, the reference numeral 10 designates, in general, a system for implementing electronic commerce (e-commerce). The system 10 is centered around a network 12, which may be any combination of the Internet, local area networks, and Intranets. For the sake of example, the network 12 will be considered to be the Internet and will utilize Transfer Control Protocol/Internet Protocol (TCP/IP) to transmit data between various nodes connected to the network. Communication techniques such as Secure Sockets Layer (SSL) or Secure HyperText Transmission Protocol (HTTPS) can be used to provide extra security for Internet transactions.

Three nodes 14, 16, and 18 are illustrated as being attached to the network 12. The nodes 14–18 are illustrated as personal computers, but it is understood that each node can actually represent one or more different computing devices, including mainframes, servers, wireless telephones, personal digital assistants, and the like.

Referring to node 14 for example, the node includes a processing unit, a memory, and a network interface, generally represented as computer 14a. The computer 14a also includes a customer interface, which in the present example includes a monitor 14b and keyboard 14c. It is understood that each of the listed components may actually represent several different components. For example, the computer 14a may actually represent a distributed processing system including different levels of main memory, hard disks, server/client memory, and remote storage locations. Furthermore, it is understood that, in many implementations, the nodes 14, 16, and 18 may be configured differently from each other and/or may have different components.

In continuance with the present example, the node 14 will represent an e-commerce customer who wishes to purchase an item or to otherwise authorize a transaction, and the node 16 will represent an e-commerce merchant willing to sell the item or complete the transaction. The node 18 will represent an authorization system that will facilitate the transaction between the customer 14 and the merchant 16.

In the present embodiment, before the transaction is completed, two preliminary steps may be performed pertaining to the authorization system 18. First, a database 50 of various entries is established. The entries correspond to account numbers and other related information. In one example, account numbers and other related information are furnished by account issuers to the authorization system. In another example, an account number and other related information may be provided by the customer, either before initiating a transaction or during the transaction.

Second, a particular entry in the database 50 must be activated. Once activated, a person or other entity having rights to an account identified by the account number can authorize e-commerce transactions using a Signature Phrase. If the entry is self-activating, as discussed further below, this second step may not be necessary.

Once these steps have been performed, the customer 14 can complete an e-commerce transaction using the customer's account by providing a Signature Phrase without the Signature Phrase or account code actually residing at the authorization system 18 or being provided to the merchant 16. The completion of the transaction may also include a certification process for further authentication. Both the transaction completion and the certification process are individually discussed in greater detail below. It is understood, however, that different embodiments may utilize some steps while not utilizing others. Furthermore, a wide range of modifications, changes and substitutions are intended in the following disclosure.

The Database

Figure 2:
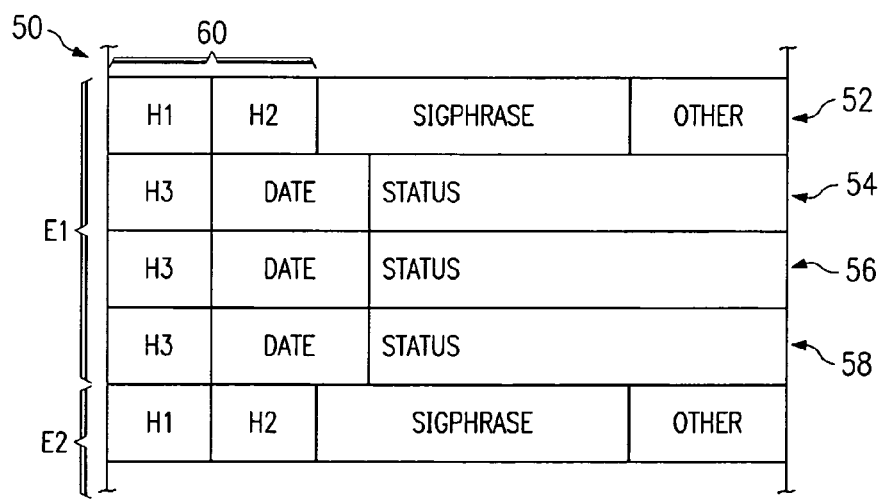
FIG. 2 is an illustration of a portion of a database in the authorization system of FIG. 1.

Referring also to FIG. 2, in one embodiment, the authorization system 18 includes a database 50 having one or more entries, represented by entries E1 and E2. Each entry may include one or more records, and each record may include one or more items. It is understood that the illustration of the database 50 in FIG. 2 is not to scale, and the illustrated size of specific entries, records, and items is not indicative of the actual size of each.

In furtherance of the present example, entry E1 includes four records: a header record 52 and three H3 records 54, 56, and 58. These records are filled with various items at different times, and may be expanded or compressed as necessary.

The Header Record

The header record 52 includes an account identifier 60 that identifies a unique account number for a specific account. In the present example, the account identifier 60 includes two items: H1 and H2. The H1 item represents the result of a hash function on a particular account number for the customer 14 (FIG. 1), as represented by the following formula:

$$H1 = \text{Hash(account number)} \quad (1)$$

A hash function is an example of a data transformation function that is performed on a string of data (the account number in the present example) to generate a unique representation (the "hash") corresponding to the string of data. The hash is generated in such a way that it is extremely unlikely that some other text will produce the same hash value. In one implementation, a message digest five (MD5) hash function is applied to the account number to produce a 128-bit representation of that number. It is also understood that the hash is a one-way function. That is, the account number cannot be derived from its hash.

The H2. item represents the hash of the account number combined with a bit string, denoted P1, as represented by the following formula:

$$H2 = \text{Hash(account number} + P1) \quad (2)$$

The bit string P1 may be a published, widely known constant. By having the extra item H2, two hashes representing the account number are created, thereby further securing a unique identity for each particular entry in the database 50. By using both items H1 and H2, it is possible to identify the entry E1 for one and only one account number. Also, it is understood that in the present example, the actual account number is not stored in the database 50. Instead, only the items H1 and H2 are stored. Since each account number produces a unique hash pair, the account number is, in effect, stored in the database 50 by the reference to the two hashes. Furthermore, since the account number cannot be derived from the hashes, the account number cannot be obtained by computer hackers or other personnel.

The header record 52 also includes a SIGPHRASE item that stores the Signature Phrase to be used with, or instead of, the account code previously assigned to the account. For example, since a customer may be reluctant to use a bank-issued PIN in e-commerce transactions, the customer can establish the Signature Phrase to act in lieu of the PIN. As a result, the Signature Phrase works identically to the PIN in e-commerce transactions, but does not work in other transactions such as automated teller machines. The Signature Phrase may be a relatively long alphanumeric string, the extended length of which increases overall security. This item is preferably hashed for security reasons.

Each entry in the database 50 may also include one or more additional items. Certain items may be associated with the header record 52 while other items may be associated with one or more H3 records 54–58. The number and arrangement of items in any particular record is flexible to specific applications and/or preferences. These additional items are collectively illustrated as an OTHER item in the database 50, and may include one, more, or all of the items listed in Table 1, below.

TABLE 1

| Item | Description |
|---|---|
| ISSID | Identifies the account issuer |
| LOGO | Identifies entity associated with the account |
| NOTE | Options for issuer notifications of authorizations |
| POLICY# | Issuer policy parameter sheet to be applied to this entry |
| EMAILID | E-mail address of customer or appropriate entity |
| EMAILOP | E-mail rules |
| EDITID | Master editing code |
| CSTAT | Card or account status |
| FSIG | Forced signature |
| DATES | Dates record was created or updated |
| STATUS | Current status of record |
| GP | Greeting phrase for authorization form |
| 2ndPH | Additional Signature Phrase with restrictions |
| 2ndPH$ | Restrictions for the Signature Phrase 3rdPH |
| 3rdPH | Additional Signature Phrase with restrictions |
| 3rdPH$ | Restrictions for the Signature Phrase 3rdPH |

It is understood that all of the items in Table 1 are merely illustrative. Many different items can be used instead of, or in addition to, any of the items herein discussed. Several of these items are provided when the entry is created, either by the issuer or by a specific customer (certain entries can accommodate multiple customers, each with a unique Signature Phrase). Other items may be modified, accessed, or removed at various times, such as is discussed in the "Account Activation and Modification" section, below.

The ISSID item identifies the account issuer. The issuer may be a particular bank or other financial entity, a corporation that has provided purchasing accounts to its employees to allow the employee to incur indebtedness on its behalf, or other similar entity. In the corporation example, the issuer may designate the corporation itself or a specific department in the corporation. In some embodiments, the customer cannot alter this item.

The LOGO item provides a logo that can represent various entities, programs, or the like that are associated with the account number. For example, the LOGO item may identify a particular airline whose logo appears on a credit card associated with the account number. Alternatively, or in addition, the LOGO item may represent a card member status, such as a "gold" or "platinum" member. Further still, the LOGO item may include a Graphics Interchange Format (GIF) sub-item that can be used for visual enhancement. In some embodiments, the customer cannot alter this item.

The NOTE item allows the account issuer to provide specific notifications for authorizations by this account. For example, a corporation may provide purchasing accounts to various employees, yet still desire to exercise a certain amount of control over the account. This NOTE item may indicate, for example, that a notification of all transaction authorizations by this account should be sent to the corporate accounting department. The NOTE item may also be customer-specific, such as allowing the president of the corporation to conduct transactions without notifying the accounting department. Further still, the NOTE item may include an e-mail address sub-item to which notifications may be sent. In some embodiments, the customer cannot alter this item.

The POLICY# item is a reference number to a parameter sheet associated with the particular entry. The parameter sheet may have general formatting and rules that can be applied to the authentication and transaction processes. For example, a corporation can assign a specific class identifier to the customer/employee 14. Employees in class "A" may have one specific group of restrictions, and employees in class "B" may have a different group of restrictions. In some embodiments, this item cannot be later altered by the customer/employee.

The EMAILID item is an e-mail address for communication to the customer 14 or other desired recipients. The e-mail address may be used, for example, when it appears someone other than the customer is attempting to use the customer's account number in a transaction. The authorization system 18 can send an e-mail to the designated recipients informing them of each account usage or only that the account is apparently being improperly used. Another example use of the e-mail address is if a customer with specific restrictions attempts a transaction that contradicts those restrictions, the authorization system 18 can send an e-mail notifying the account issuer of the transaction. In some embodiments, the customer cannot alter this item.

The EMAILOP item is a set of rules to specify when e-mail notification is to occur. For example, certain customers may request notification upon every transaction, every transaction that fails authorization, or every transaction over a certain dollar amount. In some embodiments, the customer cannot alter this item.

The EDITID item is a master-control item that allows the issuer to make changes to the entry. This item may act as an issuer-version password code that allows the issuer to make edits to the entry. For example, a corporation may cancel an account of an employee who is leaving the company. This item is preferably hashed for security reasons. In some embodiments, the customer cannot alter this item.

The GP item is a greeting phrase that is selected by the customer in the activation process and can be used during transaction authorization. For example, the greeting phrase may be "Hello Ms. Smith", or may preferably be a more personalized quote, such as "How about those Dallas Cowboys!" The greeting not only personalizes the transaction, but also serves as a subtle identifier for the authorization system 18. That is, the customer 14 can distinguish the authorization system 18 from other systems that do not have the greeting phrase, as will be discussed in greater detail in the Transaction section below.

The 2ndPH and 3rdPH items are additional, specialized Signature Phrases. These additional Signature Phrases can identify certain transaction restrictions. An example is if the customer establishes a separate Signature Phrase for a child. The child may use the account according to the restrictions. These items are preferably hashed for security reasons. In some embodiments, the customer cannot alter this item.

The 2ndPH$ and 3rdPH$ items are lists of restrictions for a particular customer who uses an additional specialized Signature Phrase 2ndPH and 3rdPH, respectively. One example of a restriction is a money limit per transaction. In some embodiments, the customer cannot alter this item.

The CSTAT item may include generic account status descriptions, such as "live," "dead," or "suspended." In some embodiments, the customer cannot alter this item.

The FSIG item is used for a corporate issuer to mandate a particular Signature Phrase to be used for the account. That is, the corporate issuer does not want the customer/employee to change the Signature Phrase. In some embodiments, the customer cannot alter this item.

The H3 Record

Each of the H3 records 54, 56, and 58 includes a representation of an account code for the account identifier 60 in question. In the case of credit card issuers, the account code may be a PIN. In the case of corporate account issuers, the account code may be an employee code. As will be discussed in greater detail below, the account code can be used as an activation code for initial account activation and accessing the account thereafter.

In the present example, the account code is represented by an item H3, which represents the hash of item H1 combined with the account code, as represented by the following formula:

$$H3 = \mathrm{Hash}(H1 + \mathrm{account\ code}) \quad (3)$$

By storing the hash of the account code in the H3 record, instead of the actual account code, an additional level of security is provided.

Each of the H3 records 54, 56, and 58 may be formatted in different ways, and may have different data stored therein. The actual number of H3 records is also flexible. For example, there may be no H3 records at all, or there may be many different H3 records. Data management routines can be used to maintain the number of H3 records to an appropriate amount. In the present embodiment, if there are no H3 records, then some item must eventually be provided to verify a specific customer's use or access to the entry. For example, a corporation may utilize the FSIG item to mandate a particular Signature Phrase to be used for the account entry. In this example, there is no H3 record, only a Signature Phrase and other header record items.

Each H3 record may also include a DATE item and a STATUS item. The DATE item represents the time when the record was entered in the database 50. In some embodiments, this item is automatically updated.

The STATUS item identifies a current status of the respective record. In some embodiments, this item can be altered by the customer or the account issuer. For the sake of example, Table 2 below illustrates possible STATUS values.

TABLE 2

| Value | Description |
|---|---|
| 1 | The H3 record was used in an account activation or access process. |
| 2 | The H3 record has not been used in an account activation or access process. |

The specific use of the DATE and STATUS items is discussed in greater detail in the "Activation and Modification" section and the "Transaction" section, below.

Database Population

The database 50 can be populated with entries in various ways. One way is for the database to receive data from one or more account issuers (e.g., banks or corporations). The data may be delivered electronically or may be manually entered, such as through one or more data storage or transmission mediums. The minimum amount of information required to initially populate the database is the account number.

The account issuer, generally, delivers the account number (or hashes H1 and H2) and the account code (or hash H3) to authorization system 18. If the actual account number and/or account code(s) are delivered (preferably by secure means), the authorization system can, in one embodiment, format the data appropriately and perform the hash functions and store the hash values for H1, H2, and H3 in the database. If hash values H1, H2, and H3 are provided by the account issuer, they are stored in the database. Once hash values H1, H2, H3 have been generated and stored, the actual account number and/or account code(s) can be erased. Alternatively, the database could store the actual account number and account code, which would become items H1, H2, and H3 in the database. While this latter embodiment is less secure, it may be easier for the issuer, merchant or customer to implement.

In another embodiment, as discussed in the next section, the customer manually provides the account number, account code, and the Signature Phrase to the database 50 at the time the customer creates/activates the account.

Account Activation and Modification

Once the database 50 has been established, but before the authorization system 18 can be used to complete an actual transaction (discussed in greater detail below), the specific entries of the database involved in the transaction should be activated.

There are various methods for activating the entries in the database 50. For one, the entries may be self-activated. That is, once the data for the entry is provided to the authorization system 18, transactions may use the entries accordingly. For example, a corporation may provide an employee with an account number and a Signature Phrase that is already activated (FSIG, Table 1).

The activation and modification process may be performed by the customer 14 separately from any transaction, or may be initiated during a specific transaction. These and other methods are discussed in greater detail with reference to FIGS. 3 and 4

Figure 3:
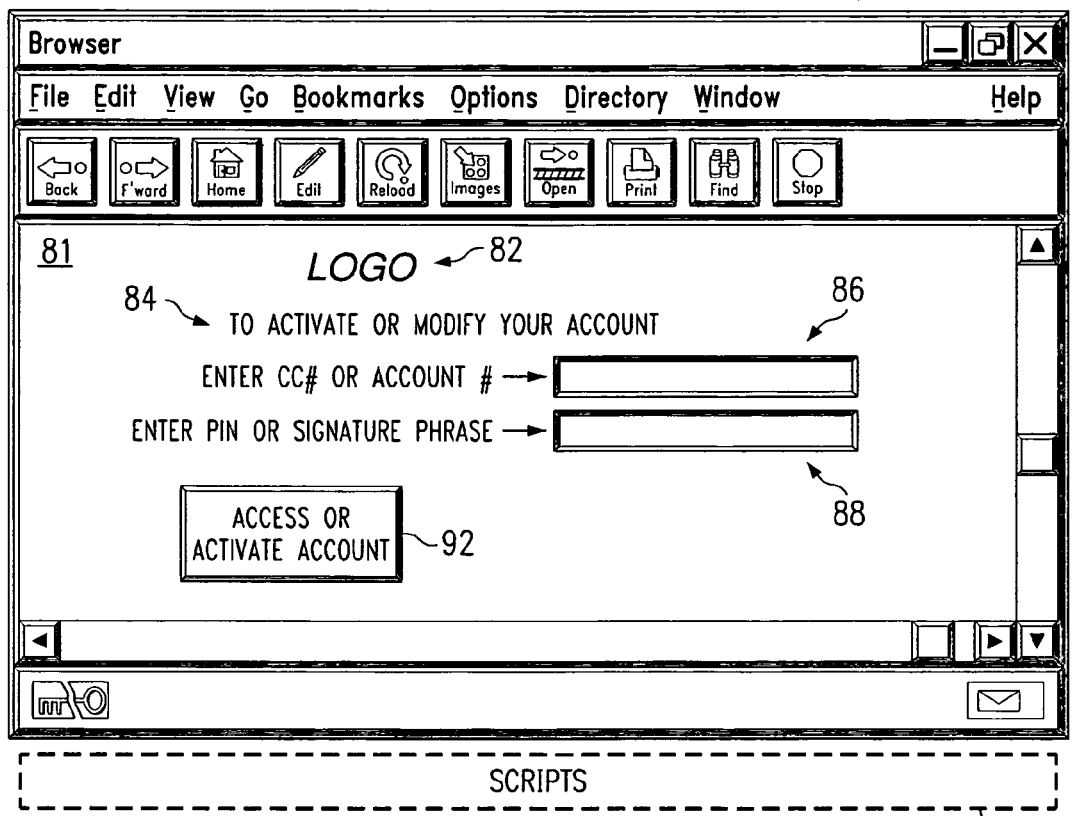
FIG. 3 is an illustration of a screen for activating or modifying an entry in the database of FIG. 2.

Referring to FIG. 3, in one embodiment, the customer 14 may initiate an activation and modification process by accessing a specific site 80 on the network 12. In the present example, the network 12 is the Internet and the specific site is a site that is provided by, or associated with, the authorization system 18. For the sake of clarity, the site 80 is illustrated as a screen in FIG. 3, such as may appear in a web browser on the customer's computer 14a. In actuality, the site 80 is a set of computer instructions that reside on a server connected to the network, such as the authorization system 18. In addition to the screen, the site 80 may also include various functional routines that may or may not be apparent to the customer 14. Some of these functional routines may be provided to and reside on the customer's computer 14a, while other functional routines may reside on the computer that is supporting the site 80 (e.g. the authorization system 18 ).

The site 80 may be accessed, for example, by the customer 14 entering a Uniform Resource Locator (URL) on the customer's computer 14a. The URL may be provided to the customer 14 in various manners. For example, the issuer of the account may mail the URL to the customer along with the account code. Alternatively, the URL can be provided by the merchant 16, can be linked from the account issuer's own web site, or other possible methods. Upon accessing the site, a screen 81 will appear on the monitor 14b of the customer's computer 14a.

In the present example, the screen 81 includes a logo 82. The logo may be specific to the authorization system 18, or may instead be specific to the issuer of the account number being activated. Although optional, the logo 82 can provide a certain degree of comfort to the customer 14 that the site is authentic, thereby encouraging the customer to complete an activation and modification process.

The screen 81 also includes instructions 84 and inputs 86 and 88 to receive the customer's account number and activation code (account code (e.g., PIN) or Signature Phrase). Although the illustrated instructions 84 are quite simple, they may be more elaborate to provide more information about the activation and modification process.

In some embodiments, the site 80 includes one or more scripts 90 running in the background of the customer's computer 14a. The scripts 90 are illustrated in phantom because, although they reside on the customer's computer 14a, they may not be visible on the monitor 14b. For example, the scripts 90 may include the hash function (as used equations 1, 2, and 3, above) and other necessary instructions. Once the account number and account code or Signature Phrase have been entered into the inputs 86, 88, the customer may then select the "Access or Activate Account" option 92 to initiate an activation and modification process.

Referring now to FIG. 4, one embodiment of an activation and modification process is designated generally with the reference numeral 100. The activation and modification process 100 is not only used for activating an entry in the database 50, but may also be used to enter, access, or change certain items in a specific database entry.

Execution of the activation and modification process is initiated at step 102 by the customer 14 accessing the authorization system 18. In the present example, the customer 14 accesses the authorization system 18 by entering the account number and an activation code for inputs 86, 88 and selecting the Access or Activate Account option 92, as discussed above with reference to FIG. 3.

At step 104, a hash is created for the account number. In the preferred embodiment, the hash is created at authorization system 18. In another embodiment, the hash is created at the customer computer 14a. At step 106, the H1, H2 values are compared to H1, H2 items in the database 50 (FIG. 2) and at step 108, a determination is made as to whether the H1, H2 values derived from the account number provided by the customer 14 are in the database 50.

If the hash values H1, H2 are in the database 50, a specific entry is identified and the authorization system 18 may now erase the actual account number (if any was provided). By erasing the actual account number as soon as possible, the possibility of theft is reduced. Execution then proceeds to step 110, where the authorization system 18 hashes the entered activation code (account code or Signature Phrase) and compares the hash value to the signature phrases (e.g., SIGPHRASE, 2ndPH, 3rdPH) in the account. Should this compare fail, the hash value is compared to the latest H3 record for the account. If at step 111 either compare succeeds, the account may be made available for viewing or update purposes.

Execution then proceeds to step 114 where the authorization system 18 determines if the customer 14 may enter, access, or change items in the account entry. If the customer 14 is allowed to access or change specific items in the entry, execution proceeds to step 116 where the customer may change the specific items (such as in Tables 1 and 2, above) accordingly. An example of one change is activating the account entry if not already activated. In the case of an account that has not theretofore been activated, the customer 14 may be prompted to provide a Signature Phrase, which is stored in the SIGPHRASE item in the header record 52. In another embodiment, the account issuer (such as a corporation) may have already provided a forced Signature Phrase (e.g., using the FSIG item in Table 1). Other items may also be accessed, updated, or changed, as allowed by any previous restrictions to the account entry.

As discussed below under "Transaction," the Signature Phrase will act as an authorizing code in the e-commerce transaction. The extended length of the Signature Phrase increases overall security. In the preferred embodiment, a hash of the Signature Phrase is stored in database 50. In the present example, the account number and the Signature Phrase are now activated for transactions.

If the activation code provided by the customer 14 is not found in the specified entry at step 111, then execution proceeds to an error handling routine at step 118. In one implementation, the error handling routine 118 initiates an additional attempt at authorization by using external systems, such as an automated teller machine network. The appropriate entity (e.g., the customer 14) may also be informed of the current situation, be it by error (e.g., the customer typed in the wrong activation code) or other condition. Alternatively, the error handling routine 118 may simply provide a message to the customer 14 to help the customer provide a proper activation code and return execution to step 110. In one implementation, the customer 14 is allowed only two attempts at providing a proper activation code. If two successive attempts fail, the account entry will be locked from further activity for an extended period of time. This effectively eliminates "brute-force" attacks on the activation code.

If an account issuer has not previously populated the database with the account number, then at step 108 the hash values H1, H2 would not be in the database 50. Then, execution would proceed to step 120, where the account number and account code or Signature Phrase, if any, are submitted by authorization system 18 for a separate (and normally external) authorization process. For example, the separate authorization process can be a standard authorization technique of account numbers and account codes, such as is used by automated teller machines for PIN verification. At step 122, in this example, a determination is made as to whether the separate authorization process indicates a valid account number and account code (if provided). The customer 14 may be further prompted to update additional needed items for verification, such as a credit card expiration date. If the separate authorization process did indicate a valid account number and account code, execution proceeds to step 124 where a new database entry including H1, H2, and H3 (if applicable) is created. Execution then proceeds to steps 114 and 116 described above. At step 116, the customer is prompted to provide a Signature Phrase, which is stored under SIGPHRASE in the header record 52.

Alternatively, the authorization and modification process 100 can provide the account number to a third party (e.g. the account issuer) at step 120, who may authorize the activation of the account. If the account is authorized at step 122, then at step 124 the third party may provide a Signature Phrase for use by the customer 14. The Signature Phrase may be a forced signature, such as is indicated by the FSIG item in the header record of the newly created account entry.

If at step 122 the separate authorization process or third party did not indicate a valid account number and activation code or did not otherwise authorize the account, execution proceeds to the error handling routine 118.

In some embodiments, activation may be an automatic update that occurs immediately upon a match between the activation code and the H3 record or previously stored Signature Phrase (step 111) or upon successful authorization (step 122). For example, once the customer enters the proper account number and account code, the STATUS value for the H3 record of the identified account code, if available, is now set equal to 1 (Table 2). Additionally, the CSTAT value may be set to an active status.

Not only does the activation and modification process 100 allow the customer 14 to activate a pre-existing entry in the database 50, it also allows the customer to access, enter, or change certain items in the entry. In some embodiments, an account entry that is not activated is only accessed with an account code. Once the account is activated, the account entry may be accessed with an account code or a previously created Signature Phrase. The Signature Phrase works similarly to the account code, with any restrictions and permissions that are dictated by the items in the identified account entry.

Referring again to steps 110–114, in some embodiments, a specific account entry may have several Signature Phrases, and permission to enter, access, or change certain items may be different for each subordinate Signature Phrase of the account. For example, a family of customers may have a single account number with different Signature Phrases for different members of the family. Depending on the Signature Phrase provided to access the account entry, certain items may or may not be accessible for review, change, update, and/or deletion. Furthermore, in one embodiment, if the account code, rather than the Signature Phrase, is used to access the account, the customer will not be permitted to view previously established database information, but will be permitted only to create new information. This would prevent an unauthorized person that has obtained a customer's account number and account code from viewing all of the customer's previously established account information.

The Transaction

Figure 5:
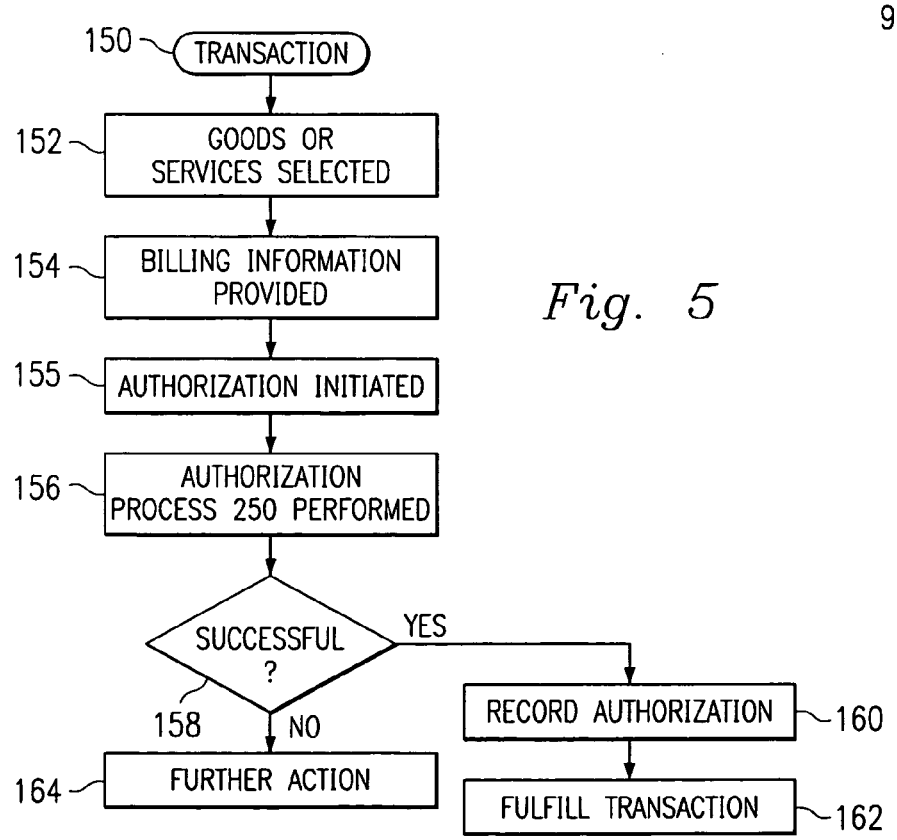
FIG. 5 is a flow chart of a transaction process.

Just as there are many different types of customers 14, networks 12, and merchants 16, there are also many different transaction scenarios. Referring to FIG. 5, a general transaction method 150 is disclosed, it being understood that the general transaction method 150 is directed to just one example scenario.

At step 152, the customer 14 selects various items at one or more merchant 16 Internet sites by accessing the merchants over the network 12. At step 154, the customer 14 goes to checkout at the merchant site and fills in the necessary information and at step 155, then customer 14 initiates authorization. At step 156, the merchant 16 prepares and forwards specific information to an authorization process. In one implementation, the specific information is forwarded as "BUY" button 212 (FIG. 6) in HTML format.

Figure 6:
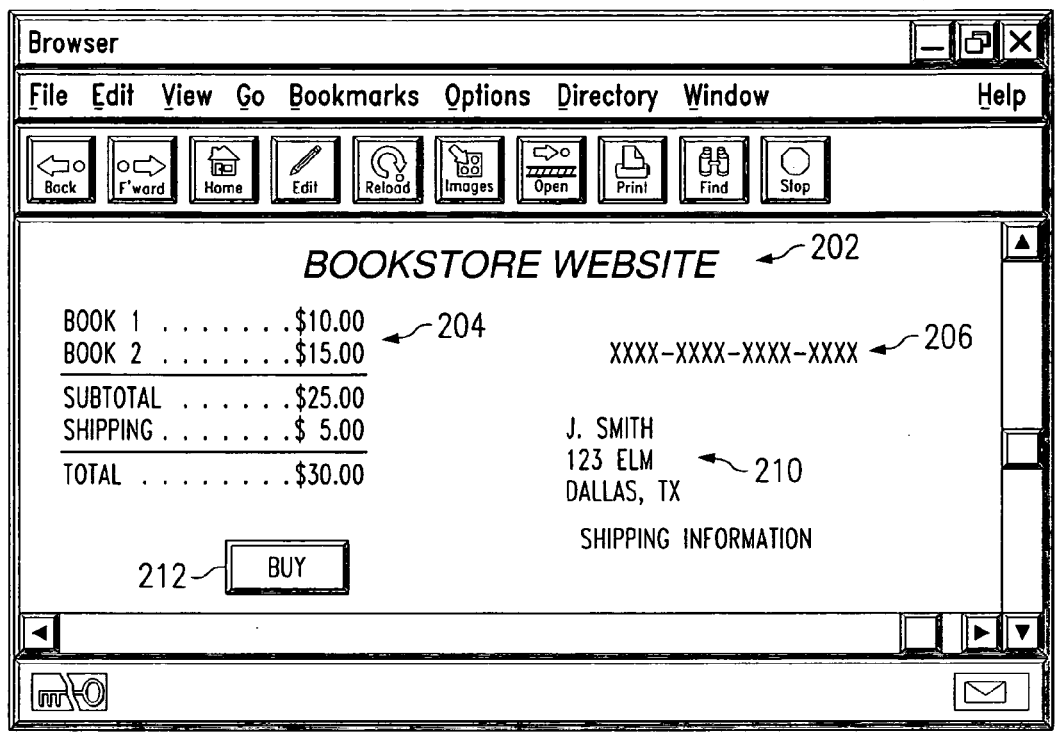
FIG. 6 is an illustration of a screen of an exemplary transaction being performed by the process in FIG. 5.

Referring also to FIG. 6, for the sake of example, the merchant 16 is an Internet bookstore and the customer 14 selects two books using an Internet browser connected to the bookstore's web site. An exemplary screen 200 of the bookstore's web site includes a logo 202 for the merchant, a description of the items being purchased 204, credit card account information 206, a shipping address 210, and a BUY button 212. In accordance with step 154 (FIG. 5), the customer 14 has filled in the necessary information, which in the present example includes credit card information including card number and a shipping address. The customer 14 has also initiated an authorization process by selecting the BUY button 212 using an appropriate key on the keyboard 14c (FIG. 1).

In the present example, the BUY button 212 is specifically associated with the authorization system 18. The BUY button 212 includes several functional items provided by the merchant, such as one or more of the items listed in Table 4, below.

TABLE 4

| Item | Description |
|---|---|
| TURL | Target link (URL) to a specific site on the authorization system 18 |
| CC# | Account number (e.g., credit card number). |
| RURL | Return link (URL) to screen 200 on the merchant's computer |
| MID | Merchant identification |
| AMT | Amount of the transaction |
| REF | A merchant's transaction reference number |
| TD | A description of the transaction |
| MSIG | Merchant's digital signature of the present data |

The CC# item may simply be the actual account number (not preferred for security reasons), or may instead be a representation of the CC# such as with the hashes H1, H2 (equations 1 and 2, above).

The MSIG item represents the digital signature of the merchant and might not be used in every embodiment. Some or all of the Table 4 items in the BUY button 212 are assembled and hashed for use in creating the MSIG item. The digital signing process is described in co-pending U.S. patent application Ser. No. 09/340,853, filed Jun. 28, 1999, and the contents of which are hereby incorporated by reference as if reproduced in their entirety. The resulting MSIG item authenticates the information and enables the authorization system 18 to confirm that the information has not been tampered with. Furthermore, certain items collected in Table 4 may be encrypted using public key encryption using the public key of authorization system 18. The public key encryption process is also described in the above-referenced and presently incorporated patent application. The information is then electronically sent to the authorization system 18. On the other end, the authorization system 18 performs applicable signature verification and decryption processes, as described in the above-referenced and presently incorporated patent application Referring now to FIG. 7, one embodiment of the authorization process is designated generally by the reference numeral 250. The authorization process may be performed at the authorization system 18 after being accessed through the Internet link indicated by the TURL included in the BUY button 212 of FIG. 6.

At step 252, the authorization process receives the information sent from the BUY button 212. The authorization process may check the received MID item (Table 4) to verify the merchant 16 may use the authorization system 18 and, further, may check the validity of the MSIG digital signature against appropriate data provided within the BUY button. In one embodiment, the BUY button 212 has the already hashed account number values H1 and H2, so the authorization process receives the account information as H1, H2. In another embodiment, the BUY button 212 has only the account number. In this embodiment, the authorization process 250 hashes the received account number. In another, less secure, implementation, the account number stored in the database 50 is not hashed. Such a determination is made responsive to the format of the items in the database 50.

At step 254, a determination is made as to whether there is an entry in the database 50 that corresponds with the received account number or hash values. If the account number or hash values are not in the database 50, execution proceeds to step 255 and a RETURN code is returned to the merchant 16. Table 5, below, lists several potential RETURN codes.

TABLE 5

| Code | Description |
|---|---|
| 1 | Account number not on file. |
| 2 | Account number in database, account not activated. |
| 3 | Account number in database, Signature Phrase given is good. |
| 4 | Cancel button selected - No Signature Phrase given. |
| 5 | Account number in database, Signature Phrase given is bad. |
| 6 | Account number in database, Signature Phrase given is good, restriction violation. |
| 7 | System not available. |
| 8 | Merchant signature is bad. |
| 9 | Transaction already processed. |
| 10 | Date/Time Expired. |
| 11 | Improper merchant delivery. |

If at step 254 there is a corresponding entry, execution proceeds to step 256 where a authorization form is created for display on the customer's computer monitor 14b. The authorization form is created using data from the BUY button 212 and the corresponding account in database 50. At step 258, the authorization form and any necessary scripts (or other instructions) are provided to the customer's computer 14a.

Figure 8:
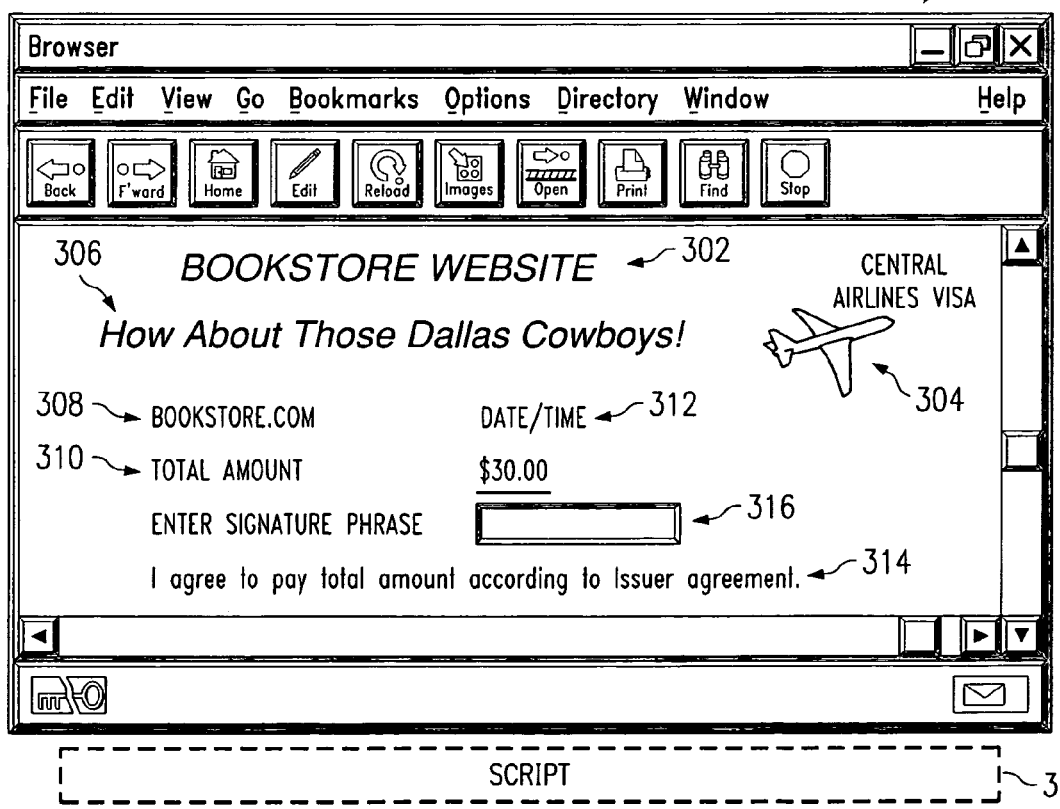
FIG. 8 is an illustration of a screen of an exemplary authorization being performed by the process of FIG. 7.

Referring now to FIG. 8, a typical example of an authorization form is generally designated with the reference numeral 300. The authorization form 300 may utilize several of the items included in database 50. Since a wide range of flexibility is anticipated in items overall, many different authorization forms can be created. The authorization form 300 includes a merchant logo 302 and an issuer logo 304, derived from the LOGO item in the entry in the database 50. In the present example, the merchant logo 302 is "BOOKSTORE WEBSITE" and the issuer logo 304 is "CENTRAL AIRLINES VISA."

The authorization form 300 also includes the custom greeting 306 derived from the GP item. The custom greeting 306 provides a level of comfort and familiarity to the customer 14, and also provides some assurance that the customer is indeed communicating with the authorization system 18. Since valuable information is being considered, some entities (e.g., merchants or thieves) may try to duplicate ("spoof") the appearance of the authorization system 18 as seen by the customer 14 in performing a transaction, to thereby improperly retrieve the customer's Signature Phrase. By having the custom greeting 306, it will be difficult for the entity to duplicate the exact look of the authorization form 300. The absence of the custom greeting 306 will notify the customer 14 that something is amiss.

There are additional ways to help prevent spoofing of the authorization form 300. For one, the authorization form can be provided by the authorization system 18 in GIF format, thereby making it difficult to modify its appearance. Additionally, the authorization form 300 may include instructions (e.g., text or graphical) to direct the attention of the customer 14 to check the current URL of the browser on the computer 14a. The URL should be from the authorization system 18, and not some other entity (e.g., the merchant 16 ), thereby further notifying the customer 14 when something is amiss.

The authorization form 300 also includes the merchant's name 308 and total amount 310 derived from the merchant provided data MID and AMT, respectively. Furthermore, the authorization form 300 includes a date/time stamp 312 and a contract clause 314, thereby giving the authorization form the look and appearance of a conventional, paper charge slip. However, instead of executing a physical signature such as on a paper charge slip, the customer 14 executes the authorization form 300 by entering a Signature Phrase in the input 316. Since the Signature Phrase is a very confidential and personal item, it is very much like a physical signature. In another implementation, customer 14 executes the authorization form 300 by entering a PIN or other account code.

In one embodiment, the authorization form 300 can include a script 320 or other calculation module. The script 320 includes the hash function to convert the Signature Phrase or account code provided by the customer 14 into a hash value. Since the script 320 is part of the authorization form 300, it resides on the customer's computer 14a. As a result, the Signature Phrase or account code itself is never transmitted over the network 12, thereby reducing the likelihood of theft. In other embodiments, the actual Signature Phrase or account code may be securely transmitted over the network 12.

At step 260, the authorization process receives the Signature Phrase or account code, or hash thereof, as discussed above. In the case of an account code hash, the BUY button would have to include the actual account number in order to compute a correct hash to compare to an H3 record in the database 50. This would not be the case if the database 50 stored the actual account code. At step 262, the received data is compared with the appropriate entry of the database 50. According to the comparison, a RETURN code (such as from Table 5, above) is returned to the merchant 16.

Referring again to FIG. 5, at step 158, the returned RETURN code is analyzed. If the RETURN code indicates a successful authorization (e.g., value 3 of Table 5, above), execution proceeds to step 160 where the authorization is recorded and at step 162, the transaction is completed and fulfilled according to the merchant's (16) customary credit card authorization and fulfillment processes. If at step 158 the RETURN code does not indicate a successful authorization, execution proceeds to step 164 where further action may be employed.

Examples of further action may be dependent on the level of information provided to the merchant, such as may be indicated by the particular RETURN code. In the example of Table 5, RETURN codes 1, 2, and 4–11 indicate unsuccessful authorization.

If the RETURN code is 1, 2, or 7, the merchant 16 may wish to operate according to conventional fraud-detection techniques. For example, the merchant 16 can review internal lists of bad accounts or use external service providers to make a decision whether to complete and fulfill the transaction accordingly.

If the RETURN code is 5, the merchant 16 and/or the authorization system 18 can treat the transaction as fraudulent. The attempted transaction can be forwarded to the appropriate entities, such as the police or the account issuer, and/or the recipient(s) identified in the EMAILID (Table 1) can be informed.

If the RETURN code is 6, the customer can be informed of the restriction and a new transaction can be initiated. Furthermore, proper notification to a specific entity, such as to the recipient identified in the EMAILID, can be given.

If the RETURN code is 8–11, software or other correction may be required. In the interim, the merchant 16 may wish to operate according to conventional authorization and fraud-detection techniques.

Transaction Certificate

In some embodiments, the authorization system 18 may provide a transaction certificate to the merchant 16, the account issuer, and/or the customer 14. One goal of the certificate is to provide a self-validating record that authenticates and memorializes a specific execution of the authorization form 300 by the customer 14 for the transaction. Table 6 provides one embodiment of a certificate.

TABLE 6

| Item | Description |
| --- | --- |
| RETURN | Table 5, above |
| DATE/TIME | An exact time and date. |
| H1 | Equation 1, above |
| H2 | Equation 2, above |
| MID | Table 4, above |
| REF | Table 4, above |
| AMT | Table 4, above |
| H4 | Hash of specific optional purchase information provided by merchant and acknowledged by customer |
| APPCODE | Approval code |
| OTHER2 | Additional data. |
| SEQ | Sequence number from the authorization system |
| ROOT | Root certificate of the authorization system |
| SIGNATURE | Digital signature from the authorization system |

Several of the items in the certificate of Table 6 are discussed elsewhere in the present disclosure. The RETURN code and DATE/TIME value are generated by the authorization process 250. For the utmost accuracy, an atomic clock can be used to provide the DATE/TIME value. The values H1, H2, MID, AMT, and REF may be provided by the merchant 16 to the authorization system 18. The APPCODE may be a traditional approval code, such as provided by conventional credit card authorization or fraud detection systems, and may require external systems to participate in order to obtain this code.

The authorization system 18 hashes certain information included in Table 4 to generate the H4 value. In one embodiment, the H4 value is the hash of the TD item from Table 4. Including the H4 value in the transaction certificate uniquely associates the transaction certificate to the particular transaction description.

The SEQ value is a unique value given by the authorization system 18 for a specific certificate. For the sake of example, every certificate issued by the authorization system 18 may be numbered sequentially, e.g., 1, 2, 3, 4, . . . .

The ROOT value represents a root certificate of the authorization system 18. In one embodiment, the ROOT value includes a public encryption key for the authorization system 18, digitally signed by four separate private keys, whose corresponding public keys are known.

The SIGNATURE value is a digital signature provided by the authorization system 18. The authorization system 18 produces its digital signature by using a private key that corresponds to the ROOT public encryption key (discussed above) to digitally sign the transaction certificate. The process of digitally signing is described in greater detail in the presently incorporated U.S. patent application Ser. No. 09/340,853. Some or all of the items in the certificate are assembled and hashed for use in the digital signature. The digital signature thereby authenticates the transaction certificate and enables the merchant site system to confirm that the information included in the transaction certificate originated at the site and has not been tampered with during transmission. Furthermore, the combination of the SIGNATURE and ROOT values makes the transaction certificate self-validating.

When the merchant 16 receives the transaction certificate, the merchant can perform a verification process to check the validity of the digital signature from the authorization system 18. Once the validity is confirmed, the merchant 16 can automatically process the transaction using conventional credit card authorization processing techniques, if applicable. If all tests pass, a record can be formatted and stored per the merchant's specifications.

CONCLUSION

The authorization system enables customers to affirmatively assert "right-of-use" for a particular account or credit card by using, in one embodiment, a Signature Phrase that is linked to the account by an affirmative activation process that uses the account issuer's specified account code for initial authentication. This, in turn, enables the merchant to complete and fulfill a transaction with a high degree of confidence that the authorizing customer is the account owner, or is at least authorized to use the account on the behalf of the owner. By establishing a Signature Phrase to authorize transactions, customers and merchants alike are more likely to use e-commerce. In some embodiments, the Signature Phrase never leaves the customer's computer, and is therefore not subject to compromise. In some embodiments where the Signature Phrase is provided to the authentication system, the Signature Phrase can be modified through a transformation function and then erased.

Alternatives such as additional Signature Phrases with restriction and notification requirements provide unique flexibility while maintaining a very secure transaction.

The authentication system does not require any unique customer side software for it to operate.

The authentication system provides a charge slip approach to e-commerce. The transaction certificate adds further integrity to the affirmative transaction authorization.

In case of a dispute between the customer and the merchant, the transaction certificate can affirmatively confirm what was authorized.

Since the transaction certificate is complete and self-validating, only the transaction certificate needs to be stored at the authorization system.

It is understood that modifications, changes and substitutions are intended in the foregoing disclosure and in some instances some features of the disclosure will be employed without corresponding use of other features. Furthermore, additional features may be employed without changing the operation of the present invention. For example, the authorization system may periodically check an account code and account number with a separate, commonly external authorization process. Accordingly, it is appropriate that the appended claims be construed broadly and in a manner consistent with the scope of the disclosure.

What is claimed is:

1. A method for authorizing transactions, comprising:
    receiving, at a credit card authorization system, merchant information, transaction information, and a credit card number of a customer from an e-commerce merchant;
    creating an authorization form at the credit card authorization system that contains the transaction information;
    causing an internet browser associated with the customer to display the authorization form;
    receiving a signature phrase from the customer via the authorization form;
    verifying that-the received signature phrase corresponds to a signature phrase stored in a credit card account associated with the credit card number; and
    causing the internet browser associated with the customer to be transferred to a web site associated with the e-commerce merchant.

2. The method of claim 1, wherein the signature phrase stored in a credit card account is one of a plurality of signature phrases stored in the credit card account.

3. The method of claim 1, further comprising:
    causing the internet browser associated with the customer to display the URL associated with the credit card authorization system in conjunction with the authorization form.

4. A method for authorizing transactions over a network, comprising:
    receiving, at an authorization system, account information and user node information after a user has initiated a transaction from a merchant using a network interface on a node associated with the user in communication with a node associated with the merchant;
    determining whether the account information corresponds to an account entry in an authorization database;
    creating an authorization form at the authorization system;
    sending the authorization form from the authorization system to the network interface on the node associated with the user as indicated by the user node information;
    receiving an authentication phrase from the user via the authorization form;
    verifying that the received authentication phrase corresponds to an authentication phrase in the account entry; and
    transferring the network interface of the user from the authorization system to the node associated with the merchant.

5. The method of claim 4 wherein the authentication phrase is a signature phrase.

6. The method of claim 5 wherein the signature phrase is transformed by the authorization form.

7. The method of claim 5 wherein the signature phrase is used for a plurality of different transactions with different merchants.

8. The method of claim 4 further comprising:
    forwarding an indication that the transaction is verified to the merchant.

9. The method of claim 4 wherein the same authorization system is for verifying different transactions for different merchants.

10. The method of claim 4 wherein the authorization form includes a logo associated with the authorization system.

11. The method of claim 4 wherein the authorization form includes information associated with the user but not provided by the user to the merchant.

12. A method for authorizing e-commerce transactions, comprising:
    a) receiving at a central authorization facility, a first merchant information and a first user information from a first merchant for a first transaction;
    b) verifying from at least one of the first merchant information and the first user information whether signature authorization is to occur;
    c) if signature authorization is to occur, preparing an authorization form at the central authorization facility;
    d) providing the authorization form to a node indicated by the first user information;
    e) receiving signature authorization from the node through the authorization form;
    f) authorizing the first merchant to obtain credit authorization for the first transaction if the signature authorization corresponds to the first user information;
    g) indicating the authorization to the first merchant; and h) transferring an internet browser associated with the first user to a node indicated by the first merchant information.

13. The method of claim 12 further comprising:
i) receiving at the central authorization facility, a second merchant information and the first user information from a second merchant for a second transaction;
j) repeating steps b)–h) for the second merchant, wherein the same signature authorization is used to authorize the second transaction.

14. The method of claim 12 further comprising:
i) receiving at the central authorization facility, the first merchant information and a second user information from the first merchant;
j) repeating steps b)–h) for the second user information.

15. The method of claim 12 further comprising:
i) providing software to the merchant for performing step a).

16. The method of claim 12 wherein the signature authorization is in the form of a signature phrase.

17. The method of claim 12 wherein the first user information includes a credit card account number.

18. The method of claim 17 wherein the central authorization facility is associated with an issuer of a credit card for the credit card account number.

19. The method of claim 12 wherein the node indicated by the first account information is an electronic address for a user who initiated the transaction.

20. A method for verifying the identity of a customer over a network, comprising:
receiving, at a verification system, merchant information and customer account information after a customer has initiated a transaction from a merchant using a network interface;
determining whether the customer account information corresponds to an account entry in a verification database;
creating an authentication form at the verification system;
causing a network interface of the user to display the authentication form;
receiving an authentication phrase from the user via the authentication form as displayed to the user;
verifying that the received authentication phrase corresponds to a stored authentication phrase in the account entry; and
transferring the network interface of the user to a node associated with the merchant.

21. The method of claim 20 further comprising:
verifying that the merchant information corresponds to the merchant.

22. The method of claim 20 further comprising:
sending verification information to the merchant.

23. The method of claim 20 further comprising:
sending information about the transaction to a credit authorization system.

24. The method of claim 20 further comprising:
receiving authorization for the transaction from a credit authorization system.

25. The method of claim 20, wherein the verification system is a credit authorization system.

26. A method for authorizing transactions between a customer and an e-commerce merchant, comprising:
receiving, at a credit card authorization system, e-commerce merchant information and a credit card number of a customer for a first transaction;
determining whether the credit card number corresponds to a credit card account in a credit card database;
creating an authorization form at the credit card authorization system for the first transaction;
displaying the authorization form to the customer via an internet browser;
receiving a first signature phrase from the customer indicating authorization for the first transaction;
verifying that the received signature phrase corresponds to a stored signature phrase in the credit card account; and
transferring the internet browser of the user to a URL associated with the e-commerce merchant.

27. A method for authorizing transactions, comprising:
receiving, at a credit card authorization system, merchant information, transaction information, and a credit card number of a customer from an e-commerce merchant after a transaction is initiated by the customer;
creating an authorization form at the credit card authorization system that contains the transaction information;
causing an internet browser associated with the customer to display the authorization form;
receiving a phrase from the customer via the authorization form;
verifying that the received phrase corresponds to a signature phrase stored in a credit card account associated with the credit card number, wherein the signature phrase is stored in the credit card account prior to the initiation of the transaction; and
causing the internet browser associated with the customer to be transferred to a web site associated with the e-commerce merchant.

28. The method of claim 27, further comprising:
transmitting the signature phrase via the authorization form to the credit card authorization system, wherein the signature phrase is not transmitted to the e-commerce merchant.

* * * * *